No. 639,007. Patented Dec. 12, 1899.
M. J. WHITEHEAD.
DISINFECTING WASTE RECEPTACLE.
(Application filed Sept. 7, 1899.)

(No Model.)

WITNESSES:
Wm. S. Bell.
Robert J. Pollitt

INVENTOR,
Mary J. Whitehead,
BY
Gartner & Steward
ATTORNEYS.

UNITED STATES PATENT OFFICE.

MARY J. WHITEHEAD, OF PATERSON, NEW JERSEY.

DISINFECTING WASTE-RECEPTACLE.

SPECIFICATION forming part of Letters Patent No. 639,007, dated December 12, 1899.

Application filed September 7, 1899. Serial No. 729,694. (No model.)

*To all whom it may concern:*

Be it known that I, MARY J. WHITEHEAD, a citizen of the United States, residing in Paterson, in the county of Passaic and State of New Jersey, have invented certain new and useful Improvements in Disinfecting Waste-Receptacles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to garbage or refuse receptacles; and the object of the invention is to provide a thoroughly sanitary vessel of this nature wherein the garbage or refuse may be drained, so as to separate the liquid and solid substances previously to burning or otherwise destroying it.

The receptacle which I will hereinafter describe is especially adapted for use as an accessory of a sink, the object being to so dispose the vessel with regard to the sink that it may drain into the latter. Thus the handling of the refuse that collects in the sink will be reduced and rendered less objectionable.

The invention consists in the improved sanitary garbage-receptacle and in the combination and arrangement of the various parts, substantially as will be hereinafter pointed out, and finally embodied in the clauses of the claim.

Figure 1:
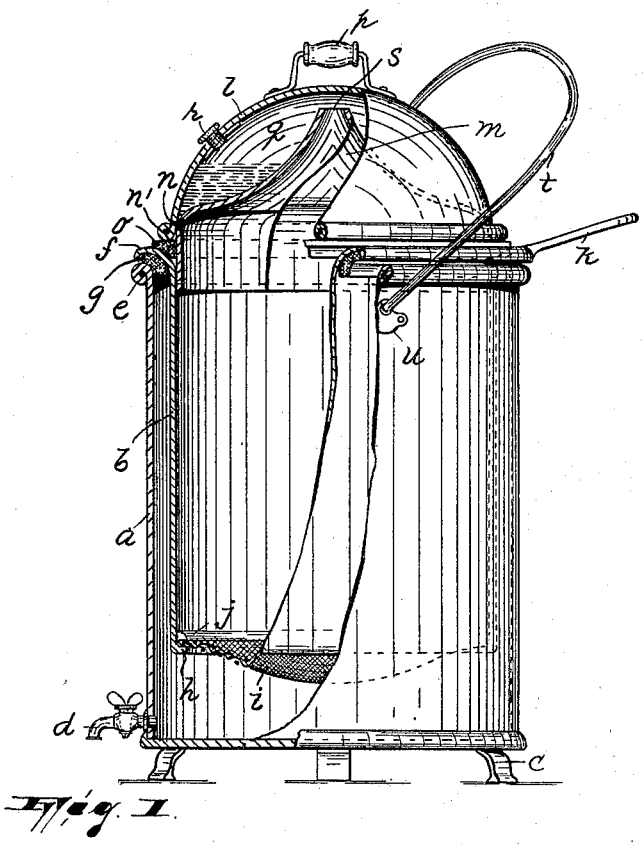
Figure 2:
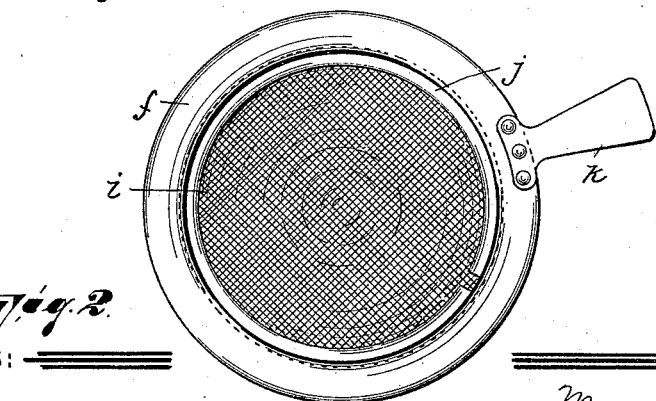

Referring to the accompanying drawings, Figure 1 is a view in side elevation, partly in section, of my improved garbage-receptacle; and Fig. 2 is a top plan view of said receptacle with the cover thereof removed.

In said drawings, $a$ and $b$ designate two receptacles, the one being telescoped into the other. The receptacle $a$, the outer one, is closed at the bottom and is supported on legs $c$. Near its bottom it is provided with a faucet $d$, and its upper edge is rolled over to form a rounded rim, as at $e$, the receptacle being made of tin, sheet-iron, or other similar material. The receptacle $b$, which is formed of material similar to that of the receptacle $a$, is open at the bottom and has its upper edge formed in an outwardly-rolling rim or flange $f$ for supporting the receptacle in the receptacle $a$. In order that the joint between the rims of the two receptacles may be air-tight, I provide a ring $g$, preferably formed of rubber and shaped to conform to the respective concave and convex surfaces of the two rims, said ring being adapted to rest upon the one and sustain the other of said rims. The bottom edge of the receptacle $b$ is turned inwardly to form a flange $h$, and on this flange rests the edge of a perforated body $i$, preferably consisting of wire-netting, the same being secured in place by means of an expansible split metallic ring $j$, which is first contracted and then forced down into the receptacle against the edge of the netting, thus acting with the flange $h$ to hold said netting in place.

In order to remove the receptacle $a$ from the receptacle $b$, it is provided with a handle or ladle $k$, projecting outwardly from its upper rim or flange $f$.

The receptacle $b$ is provided with a cover. Said cover consists of a hollow semispherical body $l$ and a substantially hollow and conical body $m$, both being preferably composed of sheet metal and secured together, with the latter projecting into the former, by means of solder or rivets, as shown at $n$. The lower edge of the part $l$ is rolled outwardly to form a rim or seat, as at $n'$, for the cover, while the lower portion of the part $m$ is substantially cylindrical, being adapted to extend down into and approximately fit inside of the receptacle $b$.

$o$ is a ring, being, like the ring $g$, preferably composed of rubber, which rests upon the rim or flange $f$ and is adapted to sustain the rim $n'$ and to form a seal at this juncture.

The cover just described is provided with a handle $p$, which is mounted upon the top of the part $l$.

In the chamber $q$, formed between the parts $l$ and $m$, I propose to place a disinfecting material, preferably a liquid, which disinfecting material may be introduced into the chamber $q$ through a tap $r$, provided in the wall of the part $l$. The top of the conical body $m$ is provided with an orifice, as $s$, whereby the fumes of the disinfectant may reach the interior of the receptacle $b$. By extending the conical part $m$ well up into the part $l$ and placing the orifice $s$ near the top thereof the disinfectant material cannot be readily dislodged from the chamber $q$ through said orifice.

$t$ is a bail that is pivotally secured to the outside of the chamber $a$ by means of ears $u$, projecting from the latter.

In view of the foregoing it will be seen that I have not only provided a thoroughly sanitary and air-tight garbage-receptacle adapted for perfectly draining off the refuse placed therein, but that the construction of said receptacle is such that its parts may be removed from each other for the purpose of cleaning, &c.

Having thus fully described my invention, what I claim as new, and desire to secure by Letters Patent, is—

1. The combination of two receptacles, the one being telescoped into and removably sustained in the other and provided with a perforated bottom wall, a discharge for the outer receptacle, a removable cover for the inner receptacle, said cover having formed therein a chamber for a disinfecting material and having an opening affording exterior communication to said chamber through its under side, said receptacles and the cover each having an exterior surrounding projection, a sealing-ring disposed between the projections of said receptacles and another sealing-ring disposed between the projections of said inner receptacle and the cover, substantially as described.

2. The combination of two receptacles, the one being telescoped into and removably sustained in the other and provided with a perforated bottom wall, a discharge for the outer receptacle, a removable cover for the inner receptacle, said cover comprising a semispherical member and a conical member, the latter projecting into the former, forming therewith a chamber for a disinfecting material and having an opening in its reduced end and a cylindrical extension at its other end adapted to fit into the inner receptacle, said receptacles and the cover each having an exterior surrounding projection, an elastic sealing-ring disposed between the projections of said receptacles and another elastic sealing-ring disposed between the projections of said inner receptacle and the cover, substantially as described.

In testimony that I claim the foregoing I have hereunto set my hand this 5th day of September, 1899.

MARY J. WHITEHEAD.

Witnesses:
JOHN W. STEWARD,
MARGARET BRITTON.